(12) United States Patent
Lung et al.

(10) Patent No.: US 7,410,005 B2
(45) Date of Patent: Aug. 12, 2008

(54) FURROW CLOSING AND LEVELING APPARATUS

(75) Inventors: Devin Lung, St. Brieux (CA); Nathan Espheter, St. Brieux (CA)

(73) Assignee: Bourgault Industries Ltd., St. Brieux Saskatchewan (CA)

( * ) Notice: Subject to any disclaimer, the term of this patent is extended or adjusted under 35 U.S.C. 154(b) by 97 days.

(21) Appl. No.: 11/496,259

(22) Filed: Jul. 31, 2006

(65) Prior Publication Data

US 2008/0023207 A1 Jan. 31, 2008

(51) Int. Cl.
*A01B 21/02* (2006.01)
*A01B 23/06* (2006.01)
*A01B 59/00* (2006.01)
*A01C 5/00* (2006.01)
*A01C 13/00* (2006.01)

(52) U.S. Cl. .................... 172/550; 172/551; 172/603; 111/156; 111/193

(58) Field of Classification Search ............... 111/139, 111/140, 149, 157, 163–169, 190–193, 156; 172/518, 579–604

See application file for complete search history.

(56) References Cited

U.S. PATENT DOCUMENTS

| 1,317,402 | A | * | 9/1919 | Taylor | ............... 111/193 |
| 2,341,352 | A | * | 2/1944 | Bateman | ............. 111/170 |
| 4,485,878 | A | | 12/1984 | Uken | |
| 5,595,249 | A | | 1/1997 | Steinberger | |
| 5,782,307 | A | | 7/1998 | Forsyth | |

OTHER PUBLICATIONS

Atomjet Disc Closer illustration displayed at http://atomjet.com/harvest.php?section=p07.

* cited by examiner

*Primary Examiner*—Christopher J. Novosad
(74) *Attorney, Agent, or Firm*—Frost Brown Todd LLC

(57) ABSTRACT

An agricultural ground working apparatus includes a mounting bracket adapted for attachment to an implement frame. A shank is pivotally attached to the mounting bracket about a shank pivot axis and extends downward from the mounting bracket to a lower end thereof adapted for engaging the ground. Right and left disc arms are pivotally attached at upper portions thereof to the mounting bracket such that the disc arms pivot about arm pivot axes independent of the shank. The disc arms extend rearward and downward from the mounting bracket on each side of the shank, and right and left discs are rotatably attached to lower portions of the corresponding right and left disc arms.

22 Claims, 5 Drawing Sheets

FURROW CLOSING AND LEVELING APPARATUS

This invention relates to agricultural seeding implements and in particular to an apparatus for closing furrows and leveling the ground.

BACKGROUND OF THE INVENTION

Agricultural seeding implements are configured to open a furrow in the soil and to deposit an agricultural product such as seed or fertilizer in the furrow. Most often, and particularly where the product in the furrow is seed, it is desired that a large proportion of the soil moved to form the furrow drop back into the furrow to cover the product.

A typical seeding implement comprises a frame mounted for movement along the ground, and a plurality of shanks attached at top ends to the frame and extending downward, with a furrow opener attached to the bottom end. Typically the shanks will be pivotally attached to the frame by a trip mechanism that allows the shanks to move rearward to clear obstructions in the field, such as rocks, roots, and the like.

Hoe-type furrow openers typically comprise a rigid member such as a hoe, knife, shovel or the like attached to the bottom of the shank. Disc furrow openers are also well known where a disc is rotatably mounted to the bottom of the shank at an angle such that the rotating disc cuts a furrow.

Where the speed of operation is relatively slow, up to about 4 miles per hour (mph), the soil moved aside by most furrow openers to form the furrow will largely fall back into the furrow, covering the product. As the operating speed increases, a larger proportion of the soil moved by the furrow openers is thrown away from the furrow and falls on the field surface adjacent to the furrow. At desired operating speeds of 5-7 mph, it is difficult to keep a satisfactory soil cover over the furrow.

U.S. Pat. No. 5,782,307 to Forsyth discloses a furrow closing apparatus comprising a pair of discs mounted to the shank such that one disc rolls along the ground on each side of the furrow opener. Soil thrown to the side by the furrow opener strikes the discs and falls back to the ground adjacent to the furrow and to some extent at least on the furrow. The discs are also oriented at an angle to move soil adjacent to the furrow toward the furrow and so cover the furrow.

The paired disc configuration of Forsyth is also utilized in U.S. Pat. No. 5,595,249 to Steinberger where a pair of discs is mounted to a shank to level the ground behind an implement, and also in U.S. Pat. No. 4,485,878 to Uken in a row crop cultivator where a pair of discs is mounted to a shank to prevent soil thrown by the shank at higher speeds from covering and damaging young plants.

A similar arrangement is manufactured by Atomjet Industries of Brandon, Manitoba, Canada for closing a furrow. A bracket is mounted on a midpoint of the shank and an arm is pivotally mounted to the bracket on each side of the shank and extends downward and rearward to a disc rotatably mounted on the end of each. The arm and disc float with no downward pressure on the arm. The angle of the discs to the direction of travel can be varied to change the orientation of the discs to change the amount and direction of movement of the soil or crop residue engaged by the discs.

SUMMARY OF THE INVENTION

It is an object of the present invention to provide a ground working apparatus for closing furrows and leveling the ground that overcomes problems in the prior art.

In a first embodiment the present invention provides an agricultural ground working apparatus comprising a mounting bracket adapted for attachment to an implement frame for movement along the ground in an operating travel direction. A shank is pivotally attached at an upper portion thereof to the mounting bracket about a shank pivot axis oriented transverse to the operating travel direction, and the shank extends downward from the mounting bracket to a lower end thereof adapted for engaging the ground. Right and left disc arms are pivotally attached at upper portions thereof to the mounting bracket about corresponding right and left arm pivot axes oriented transverse to the operating travel direction such that the disc arms pivot about the arm pivot axes independent of the shank. The disc arms extend rearward and downward from the mounting bracket on each side of the shank, and right and left discs are rotatably attached to lower portions of the corresponding right and left disc arms.

In a second embodiment the present invention provides an agricultural ground working apparatus comprising a mounting bracket adapted for attachment to an implement frame for movement along the ground in an operating travel direction. A shank is pivotally attached at an upper portion thereof to the mounting bracket about a shank pivot axis oriented transverse to the operating travel direction, the shank extending downward from the mounting bracket to a lower end thereof adapted for engaging the ground. Right and left pivot blocks are pivotally attached to right and left sides of the mounting bracket about an arm pivot axis oriented transverse to the operating travel direction such that the pivot blocks pivot about the arm pivot axis independent of the shank. Right and left disc arms are attached at upper portions thereof to the corresponding right and left pivot blocks. The disc arms extend rearward and downward from the mounting bracket on each side of the shank, and right and left discs are rotatably attached to lower portions of the corresponding right and left disc arms.

The shank and disc arms move independently of each other, such that shock forces on the shank are not transmitted to the discs. This independent motion further increases the envelope in which the arms and discs can move, increasing the design choices that are available. Upper and lower stops can be provided to limit pivoting movement of the arms. The disc arms can be configured to rotate with respect to the mounting bracket to change the inclination of the discs, and can conveniently be positively locked in a defined and repeatable position to achieve a desired inclination. When not required or desired for some field operations the arms and discs can be locked in a raised idle position above the ground.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
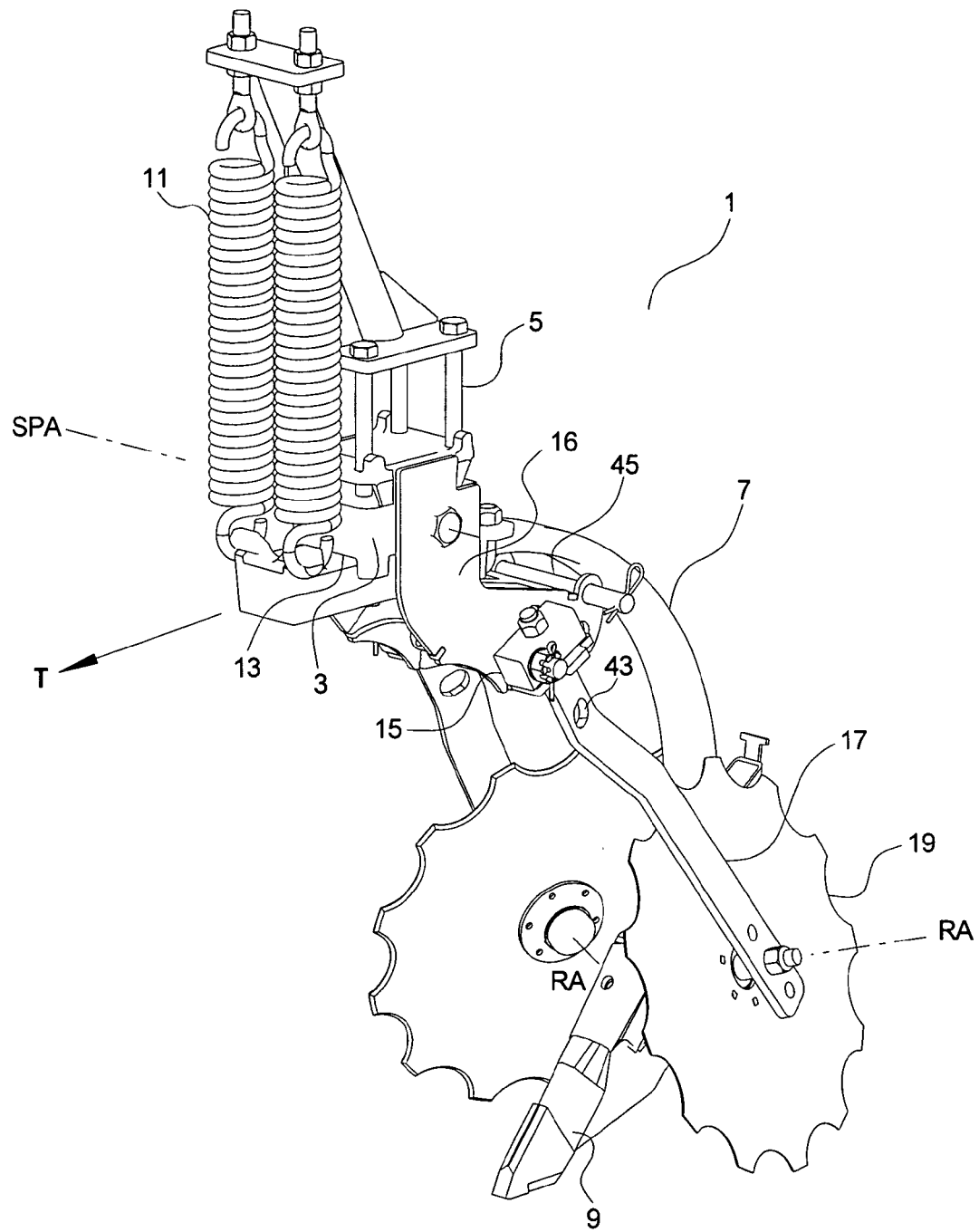
FIG. 1 is a perspective view of an embodiment of the ground working apparatus of the invention in an operating position.
Figure 2:
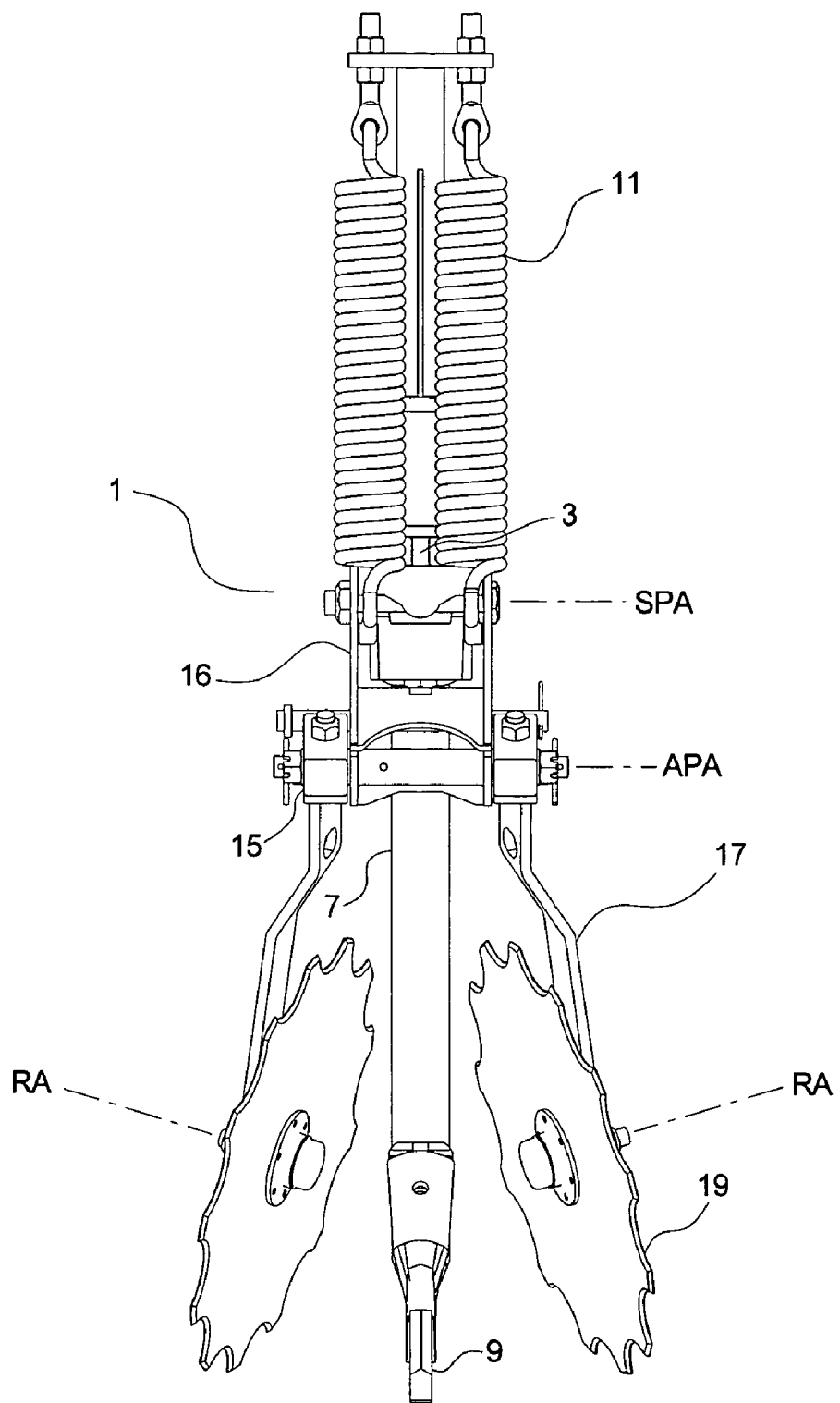
FIG. 2 is a front view of the embodiment of FIG. 1 in the operating position.
Figure 3:
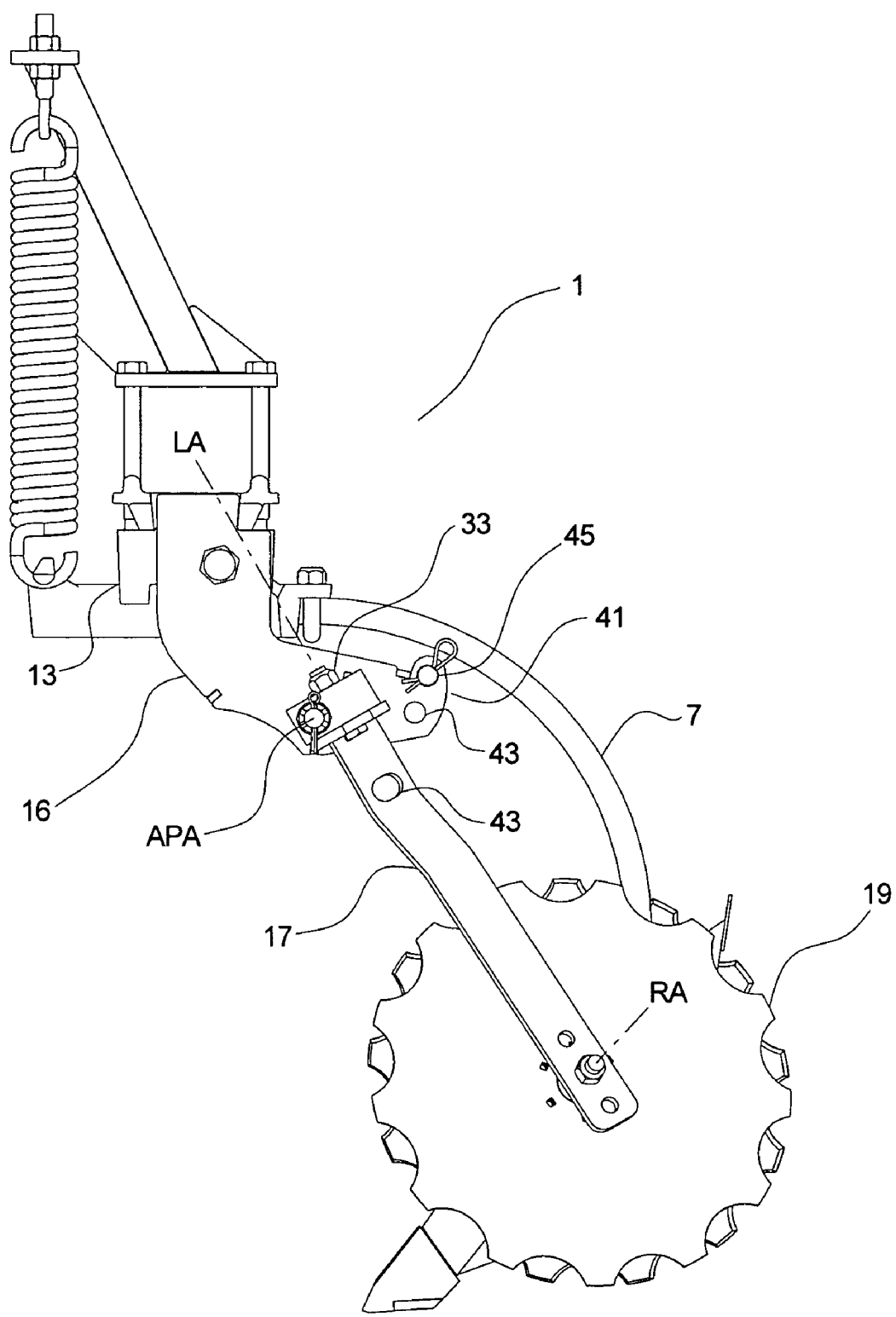
FIG. 3 is a side view of the embodiment of FIG. 1 in the operating position.

FIGS. 1-3 illustrate an embodiment of an agricultural ground working apparatus 1 of the present invention for closing furrows and leveling the ground. The apparatus 1 comprises a mounting bracket 3 adapted for attachment to an implement frame by bolts 5 for movement along the ground in an operating travel direction T.

A shank 7 is pivotally attached at the upper end thereof to the mounting bracket 3 about a shank pivot axis SPA oriented transverse to the operating travel direction T. The shank 7 extends downward from the mounting bracket 3 to a lower end thereof adapted for engaging the ground by attachment to a furrow opener 9 as illustrated, or a cultivator shovel or other ground engaging tool as is known in the art.

As is well known in the art the shank 7 is biased downward to the illustrated operating position by a pair of springs 11 which maintain the shank 7 in the operating position where the portion of the shank 7 forward of the shank pivot axis SPA bears against a stop 13. When a sufficient rearward force is exerted on the shank 7, such by an rock or like obstruction in the ground, the shank 7 trips and the furrow opener 9 and the bottom end of the shank 7 will pivot rearward about the shank pivot axis SPA until the obstruction is cleared and the springs 11 return the shank 7 to the operating position. Shock loading forces on the shank 7 are significant. Striking a solidly buried rock at operating speeds of 5-7 mph causes the shank 7 to accelerate rearward at a high rate, and similarly, once the obstacle is cleared the shank 7 is accelerated forward at a similarly high rate by the springs 11, and then stops suddenly when it contacts the stop 13.

Pivot blocks 15 are pivotally attached to downward extending right and left side plates 16 attached to the mounting bracket 3 about an arm pivot axis APA oriented transverse to the operating travel direction T such that the pivot blocks 15 pivot about the arm pivot axis APA independent of the shank 7. Thus the disc arms 17 and discs 19 attached to the pivot blocks 15 are not subjected to the shock forces experienced by the shank 7 as is the case with prior art disc apparatuses that are mounted directly to the shank 7.

Disc arms 17 are attached at upper ends thereof to the corresponding pivot blocks 15, and extend rearward and downward from the mounting bracket 3 on each side of the shank 7. A disc 19 is rotatably attached to the bottom end of each disc arm 17. The discs 19 are oriented such that rotational axes RA of the discs 19 are inclined from a position perpendicular to the operating travel direction, and are inclined from a horizontal position. The discs 19 are located such that soil thrown laterally by the furrow opener 9 on the lower end of the shank 7 as it moves through the ground contacts the discs 9. The illustrated discs 19 are scalloped to ensure rotation.

Where the discs and arms are attached to the shank as in the prior art, care must be taken that the discs and arms do not contact any part of the implement when the shank trips. Since the discs 19 and disc arms 17 on the present apparatus 1 do not move rearward when the shank 7 trips, the discs 19 and arms 17 have a larger range of operating motion or envelope within which they can move. Increased design choices are therefore available, for example the discs 19 can have a larger diameter, or the arms 17 can be longer.

In the prior art the bracket attached to the shank also can interfere with the flow of crop residue around the shank, causing plugging of the implement with crop residue.

Figure 5:
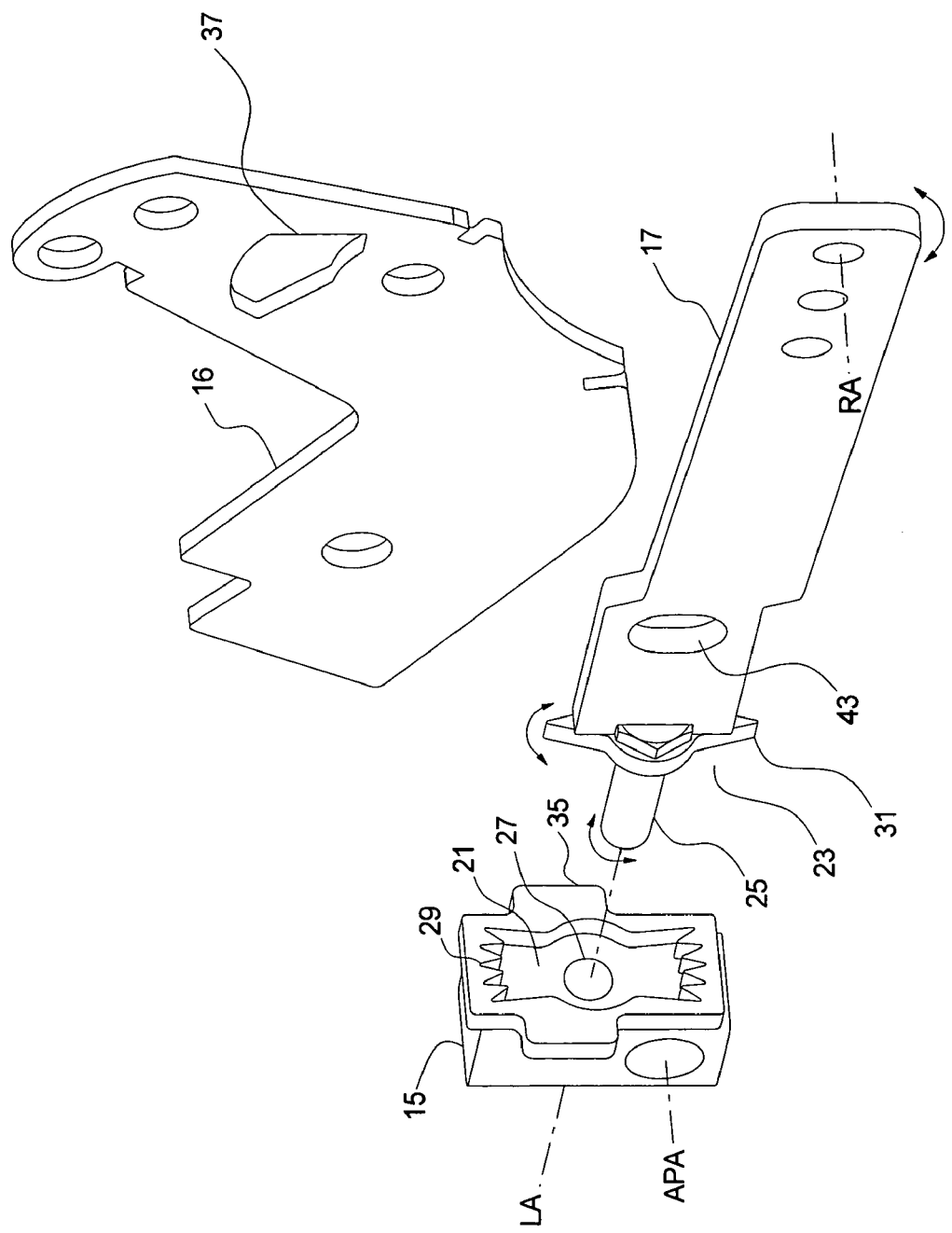
FIG. 5 is a perspective exploded view of the attachment of the disc arm to the pivot block in the embodiment of FIG. 1.

A longitudinal axis LA of each disc arm 17 is oriented transverse to the corresponding arm pivot axis APA. As illustrated in FIG. 5 the disc arms 17 are configured to be rotated with respect to the corresponding pivot blocks 15 about longitudinal arm axes LA thereof to a plurality of angular positions, and each disc arm 17 is secured to the corresponding pivot block 15 in an angular position selected to provide a desired inclination.

The pivot block 15 defines a recess 21 and the top end 23 of the disc arm 17 is engaged in the recess 21 and is rotatable in the recess 21 about the longitudinal axis LA thereof. In the illustrated embodiment a threaded bolt 25 on the top end 23 of the disc arm 17 extends through a cylindrical aperture 27 in the end of the recess 21. The bolt 25 in the aperture 27 defines the longitudinal axis LA. A plurality of notches 29 are provided in the recess 21, each notch 29 corresponding to an angular position of the disc arm 17. Lobes 31 on the top end 23 of the disc arm 17 is adapted to engage a pair of the notches 29 to secure the disc arm 17 in the recess 21 at a selected angular position. When the bolt 25 is partially engaged in the aperture 27 the arm 17 can be rotated about the longitudinal axis LA to align the lobes 31 with a pair of notches 29 that will provide the desired inclination of the rotational axis RA of the disc.

When the lobes 31 and notches 29 are aligned, the bolt 25 is moved fully into the aperture 27 and the lobes 31 enter the notches 29. A nut 33 is threaded onto the end of the bolt 25 and the arms 17 are thus positively secured to the pivot blocks 15 such that rotation of the arms 17 with respect to the pivot blocks is prevented. Movement of the rotational axes of the discs away from the selected inclination is prevented by engagement of the lobes 31 in the notches 29.

By locating the lobes 31 in the same selected notches 29 on all ground working apparatuses on an implement, a substantially consistent disc action can be quickly, conveniently, and accurately provided across the implement. Similarly, where by trial it is found that the disc arm 17 should be positioned in one set of notches 29 for a first field situation, and in a second set of notches 29 for a second field situation, when going back and forth from the first to the second situation the arms 17 can readily be properly positioned.

As can be seen from the illustrations the arms 17 are shaped and configured such that rotating an arm 17 about its longitudinal axis LA will change both the fore and aft and up and down angle of the attached disc 19. Changing the inclination of the discs 19 will change the amount and direction of movement of the soil or crop residue engaged by the discs 19.

It is desirable to provide positive upper and lower stops to prevent pivotal movement of the disc arms 17 beyond upper and lower limits. Excessive upward movement can bring the disc 19 or arm 17 into contact with the implement frame, or components such as hoses, manifolds, and the like. If the arm 17 was allowed to swing downward freely the arm 17 could move to a position where the arm 17 extended forward pushing the disc 19 rather than pulling the disc 19 in the desired operating position.

To provide the upper and lower stops, the illustrated embodiment comprises a tab 35 extending from the pivot block 15 into a corresponding slot 37 in the side plates 16 attached to the mounting bracket 3, as illustrated in FIG. 5, such that as the pivot block 15 pivots upward the tab 35 will contact the top end of the slot 37, preventing further upward movement. Similarly as the pivot block 15 pivots downward the tab 35 will contact the bottom end of the slot 37, preventing further downward movement. The illustrated pivot block 15 has a tab 35 extending from each side thereof, allowing the same pivot block 15 to be used on both right and left sides of the mounting bracket 3.

Figure 4:
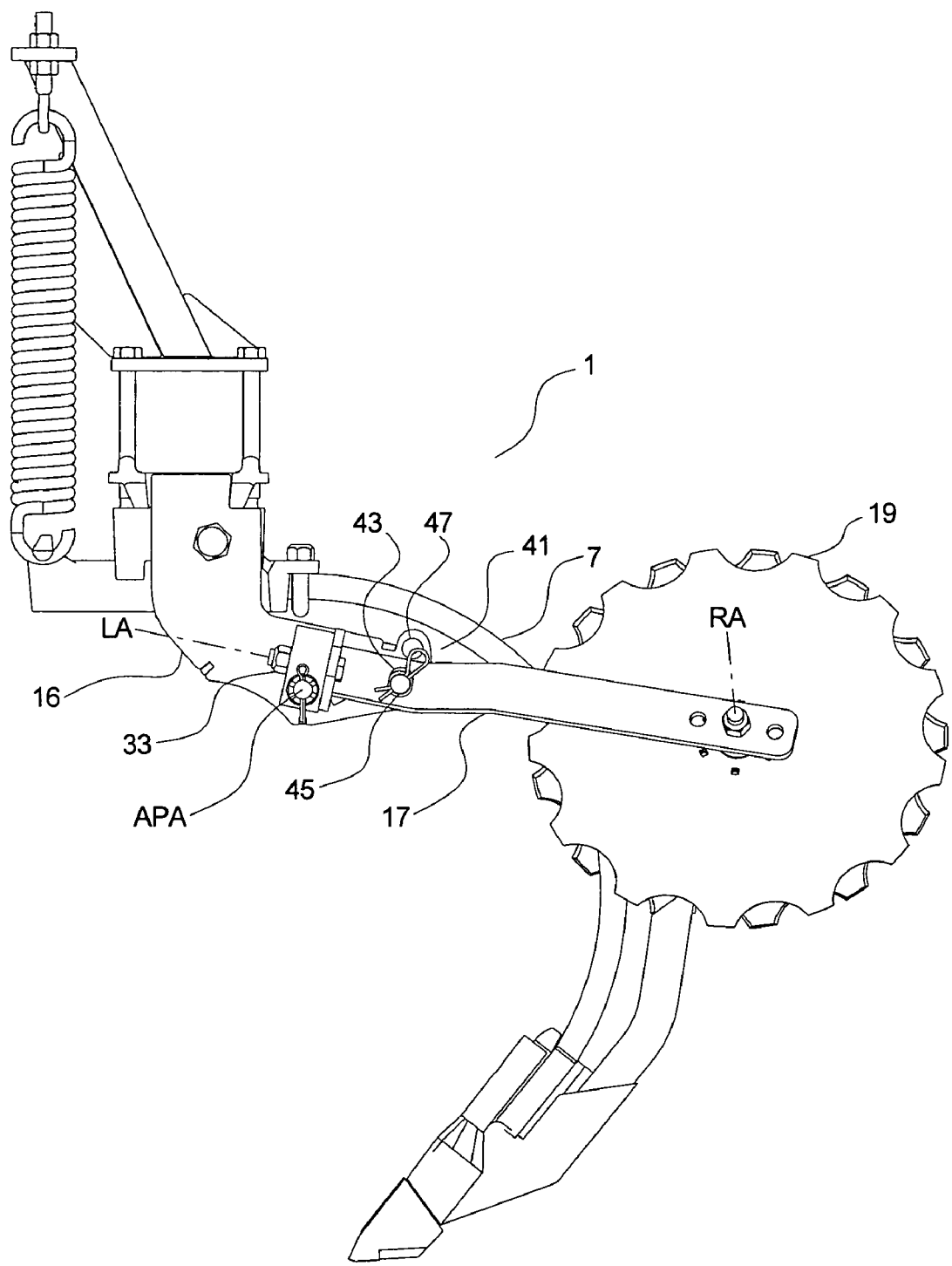
FIG. 4 is a side view of the embodiment of FIG. 1 in the raised idle position.

In some field operations the discs 19 may not be required or desired. The illustrated apparatus 1 thus provides a lock mechanism 41 operative to lock the disc arms 17 in a raised idle position as illustrated in FIG. 4. The disc arms 17 and side plates 16 attached to the mounting bracket 3 define idle holes 43 oriented such that the idle holes 43 are aligned when the disc arms 17 are in the raised idle position. An idle pin 45 is stored in storage holes 47 on the mounting bracket 3 when not in use as illustrated in FIG. 3, and is inserted into aligned idle holes 43 on the disc arms 17 and on the mounting bracket 3, as illustrated in FIG. 4, to lock the arms 17 in the idle position.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An agricultural ground working apparatus, the apparatus comprising:
   a mounting bracket adapted for attachment to an implement frame for movement along the ground in an operating travel direction;
   a shank pivotally attached at an upper portion thereof to the mounting bracket about a shank pivot axis oriented transverse to the operating travel direction, the shank extending downward from the mounting bracket to a lower end thereof adapted for engaging the ground;
   right and left disc arms pivotally attached at upper portions thereof to the mounting bracket about corresponding right and left arm pivot axes oriented transverse to the operating travel direction such that the disc arms pivot about the arm pivot axes without moving the shank and the shank pivots about the shank pivot axis without moving the disc arms, the disc arms extending rearward and downward from the mounting bracket on each side of the shank; and
   right and left discs rotatably attached to lower portions of the corresponding right and left disc arms.

2. The apparatus of claim 1 wherein a rotational axis of at least one disc is inclined from a position perpendicular to the operating travel direction.

3. The apparatus of claim 2 wherein the rotational axis is inclined from a horizontal position.

4. The apparatus of claim 3 wherein the at least one disc is rotatably mounted to a corresponding disc arm having a longitudinal arm axis oriented transverse to the corresponding arm pivot axis, and wherein the disc arm is configured to be rotated about a longitudinal arm axis thereof to a plurality of angular positions, and wherein the disc arm is secured in an angular position selected to provide a desired disc inclination.

5. The apparatus of claim 4 comprising:
   a pivot block pivotally attached to the mounting bracket about the arm pivot axis, the pivot block defining a recess;
   wherein a top end of the disc arm is engaged in the recess and is rotatable in the recess about the longitudinal arm axis; and
   wherein the top end of the disc arm can be secured in the recess at a selected one of a plurality of available angular positions.

6. The apparatus of claim 5 comprising a plurality of notches in the recess, each notch corresponding to an angular position and wherein a lobe on the disc arm is adapted to engage a notch to secure the disc arm in the recess at a selected angular position.

7. The apparatus of claim 1 comprising an upper stop operative to prevent upward pivotal movement of a disc arm beyond an upper limit.

8. The apparatus of claim 7 further comprising a lower stop operative to prevent downward pivotal movement of a disc arm beyond a lower limit.

9. The apparatus of claim 8 wherein the disc arm is attached to a pivot block pivotally attached to the mounting bracket about the arm pivot axis, and wherein the upper and lower stops are provided by a tab extending from the pivot block through a slot in the mounting bracket.

10. The apparatus of claim 1 comprising a lock mechanism operative to lock the disc arms in a raised idle position.

11. The apparatus of claim 10 wherein the disc arms and mounting bracket define idle holes oriented such that the idle holes are aligned when the disc arms are in the raised idle position and wherein the lock mechanism comprises an idle pin adapted to be inserted into aligned idle holes on a disc arm and on the mounting bracket.

12. The apparatus of claim 1 wherein the right and left discs are located such that soil thrown laterally by the lower end of the shank when the shank moves through the ground contacts the discs.

13. An agricultural ground working apparatus, the apparatus comprising:
   a mounting bracket adapted for attachment to an implement frame for movement along the ground in an operating travel direction;
   a shank pivotally attached at an upper portion thereof to the mounting bracket about a shank pivot axis oriented transverse to the operating travel direction, the shank extending downward from the mounting bracket to a lower end thereof adapted for engaging the ground;
   right and left pivot blocks pivotally attached to right and left sides of the mounting bracket about an arm pivot axis oriented transverse to the operating travel direction such that the pivot blocks pivot about the arm pivot axis without moving the shank and the shank pivots about the shank pivot axis without moving the pivot blocks;
   right and left disc arms attached at upper portions thereof to the corresponding right and left pivot blocks, the disc arms extending rearward and downward from the mounting bracket on each side of the shank; and
   right and left discs rotatably attached to lower portions of the corresponding right and left disc arms.

14. The apparatus of claim 13 wherein the right and left discs are rotatably attached such that rotational axes of the discs are inclined from a position perpendicular to the operating travel direction.

15. The apparatus of claim 14 wherein the right and left discs are rotatably attached such that rotational axes of the discs are inclined from a horizontal position.

16. The apparatus of claim 15 wherein a longitudinal axis of each disc arm is oriented transverse to the corresponding arm pivot axis, and wherein the disc arms are configured to be rotated with respect to the corresponding pivot blocks about longitudinal arm axes thereof to a plurality of angular positions, and wherein each disc arm is secured to the corresponding pivot block in an angular position selected to provide a desired disc inclination.

17. The apparatus of claim 16 wherein the pivot blocks define a recess and wherein a top end of each disc arm is engaged in a corresponding recess and is rotatable in the recess about the longitudinal axis thereof; and wherein the disc arms can be secured in the recesses at a selected one of a plurality of available angular positions.

18. The apparatus of claim 17 comprising a plurality of notches in the recess, each notch corresponding to an angular position, and wherein a lobe on each disc arm is adapted to engage a notch to secure the disc arm in the recess at a selected angular position.

19. The apparatus of claim 18 comprising a tab extending from each pivot block into a corresponding slot in the mounting bracket such that the tab is operative to prevent upward pivotal movement of each disc arm beyond an upper limit and is operative to prevent downward pivotal movement of each disc arm beyond a lower limit.

20. The apparatus of claim 13 wherein the right and left discs are located such that soil thrown laterally by the lower end of the shank when the shank moves through the ground contacts the discs.

21. The apparatus of claim 13 comprising a lock mechanism operative to lock the disc arms in a raised idle position.

22. The apparatus of claim 21 wherein the disc arms and mounting bracket define idle holes oriented such that the idle holes are aligned when the disc arms are in the raised idle position and wherein the lock mechanism comprises an idle pin adapted to be inserted into aligned idle holes on a disc arm and on the mounting bracket.

* * * * *